United States Patent [19]
Wright

[11] Patent Number: 6,106,048
[45] Date of Patent: Aug. 22, 2000

[54] SUN VISOR FOR AUTOMOBILES

[76] Inventor: Paul J. Wright, 250 Garafraxa Street East, Fergus, Ontario, Canada, N1M 1E1

[21] Appl. No.: 09/109,704

[22] Filed: Jul. 2, 1998

[51] Int. Cl.⁷ .................................................. B60J 1/02
[52] U.S. Cl. .................................................. 296/97.13
[58] Field of Search ........................ 296/97.9, 97.12, 296/97.13

[56] References Cited

U.S. PATENT DOCUMENTS

| | | | |
|---|---|---|---|
| 1,599,183 | 9/1926 | Phillips | 296/97.13 |
| 2,456,484 | 12/1948 | Bell | 296/97.9 |
| 2,695,193 | 11/1954 | Hamel | 296/97.13 |
| 2,912,275 | 11/1959 | O'Neal | 296/97.13 |
| 2,965,415 | 12/1960 | Dryden | 296/97.13 |
| 3,244,447 | 4/1966 | Whitaker | 296/97.12 |
| 3,825,296 | 7/1974 | Peterson | 296/97.13 |

FOREIGN PATENT DOCUMENTS

| | | | |
|---|---|---|---|
| 1101076 | 9/1955 | France | 296/97.13 |
| 499026 | 10/1955 | Italy | 296/97.12 |

*Primary Examiner*—Gary C. Hoge

[57] ABSTRACT

A new sun visor for automobiles for providing multiple panels for use in different weather conditions. The inventive device includes a mounting bracket secured to an upper interior surface of a motor vehicle. A pair of swivel arms are coupled with the mounting bracket to create a pivotal connection whereby the swivel arms can be freely maneuvered. An opaque visor is secured to an outer section of a first of the pair of swivel arms. A tinted, transparent visor is secured to an outer section of a second of the pair of swivel arms.

4 Claims, 2 Drawing Sheets

SUN VISOR FOR AUTOMOBILES

BACKGROUND OF THE INVENTION

1. Field of the Invention

The present invention relates to auxiliary sun visors and more particularly pertains to a new sun visor for automobiles for providing multiple panels for use in different weather conditions.

2. Description of the Prior Art

The use of auxiliary sun visors is known in the prior art. More specifically, auxiliary sun visors heretofore devised and utilized are known to consist basically of familiar, expected and obvious structural configurations, notwithstanding the myriad of designs encompassed by the crowded prior art which have been developed for the fulfillment of countless objectives and requirements.

Known prior art auxiliary sun visors include U.S. Pat. No. 4,666,205 to Nakagawa; U.S. Pat. No. 4,913,483 to Jasso; U.S. Pat. No. 3,351,375 to Wheeler; U.S. Pat. No. 3,499,679 to Olander; U.S. Pat. No. Des. 325,719 to Langlais; and U.S. Pat. No. 4,195,876 to Timperio.

While these devices fulfill their respective, particular objectives and requirements, the aforementioned patents do not disclose a new sun visor for automobiles. The inventive device includes a mounting bracket secured to an upper interior surface of a motor vehicle. A pair of swivel arms are coupled with the mounting bracket to create a pivotal connection whereby the swivel arms can be freely maneuvered. An opaque visor is secured to an outer section of a first of the pair of swivel arms. A tinted, transparent visor is secured to an outer section of a second of the pair of swivel arms.

In these respects, the sun visor for automobiles according to the present invention substantially departs from the conventional concepts and designs of the prior art, and in so doing provides an apparatus primarily developed for the purpose of providing multiple panels for use in different weather conditions.

SUMMARY OF THE INVENTION

In view of the foregoing disadvantages inherent in the known types of auxiliary sun visors now present in the prior art, the present invention provides a new sun visor for automobiles construction wherein the same can be utilized for providing multiple panels for use in different weather conditions.

The general purpose of the present invention, which will be described subsequently in greater detail, is to provide a new sun visor for automobiles apparatus and method which has many of the advantages of the auxiliary sun visors mentioned heretofore and many novel features that result in a new sun visor for automobiles which is not anticipated, rendered obvious, suggested, or even implied by any of the prior art auxiliary sun visors, either alone or in any combination thereof.

To attain this, the present invention generally comprises a mounting bracket secured to an upper interior surface of a motor vehicle. The mounting bracket has a threaded screw extending through a central portion thereof for securement to the motor vehicle. An outer surface of the mounting bracket is defined by a pair of raised sockets. Each of the sockets have an aperture formed therewithin. A pair of swivel arms are coupled with the mounting bracket. Each of the swivel arms have a ball disposed on an inner end thereof for being received within the apertures of the raised sockets of the mounting bracket to create a pivotal connection whereby the swivel arms can be freely maneuvered. An opaque visor is secured to an outer section of a first of the pair of swivel arms. A tinted, transparent visor is secured to an outer section of a second of the pair of swivel arms. The tinted, transparent visor has a peripheral frame extending therearound.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sun visor for automobiles apparatus and method which has many of the advantages of the auxiliary sun visors mentioned heretofore and many novel features that result in a new sun visor for automobiles which is not anticipated, rendered obvious, suggested, or even implied by any of the prior art auxiliary sun visors, either alone or in any combination thereof.

It is another object of the present invention to provide a new sun visor for automobiles which may be easily and efficiently manufactured and marketed.

It is a further object of the present invention to provide a new sun visor for automobiles which is of a durable and reliable construction.

An even further object of the present invention is to provide a new sun visor for automobiles which is susceptible of a low cost of manufacture with regard to both materials and labor, and which accordingly is then susceptible of low prices of sale to the consuming public, thereby making such sun visor for automobiles economically available to the buying public.

Still yet another object of the present invention is to provide a new sun visor for automobiles which provides in the apparatuses and methods of the prior art some of the advantages thereof, while simultaneously overcoming some of the disadvantages normally associated therewith.

Still another object of the present invention is to provide a new sun visor for automobiles for providing multiple panels for use in different weather conditions.

Yet another object of the present invention is to provide a new sun visor for automobiles which includes a mounting bracket secured to an upper interior surface of a motor vehicle. A pair of swivel arms are coupled with the mounting bracket to create a pivotal connection whereby the swivel arms can be freely maneuvered. An opaque visor is secured to an outer section of a first of the pair of swivel arms. A tinted, transparent visor is secured to an outer section of a second of the pair of swivel arms.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
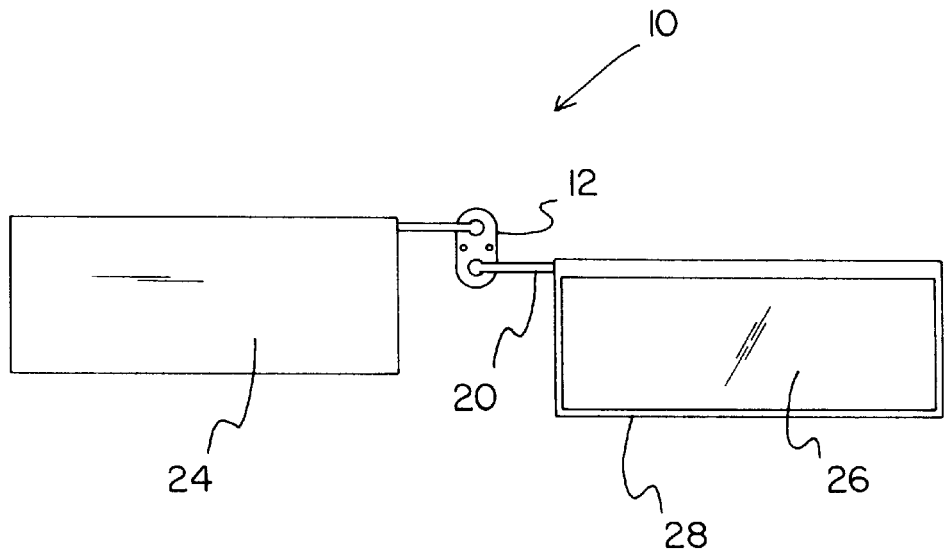
FIG. 1 is a front view of a new sun visor for automobiles according to the present invention.
Figure 2:
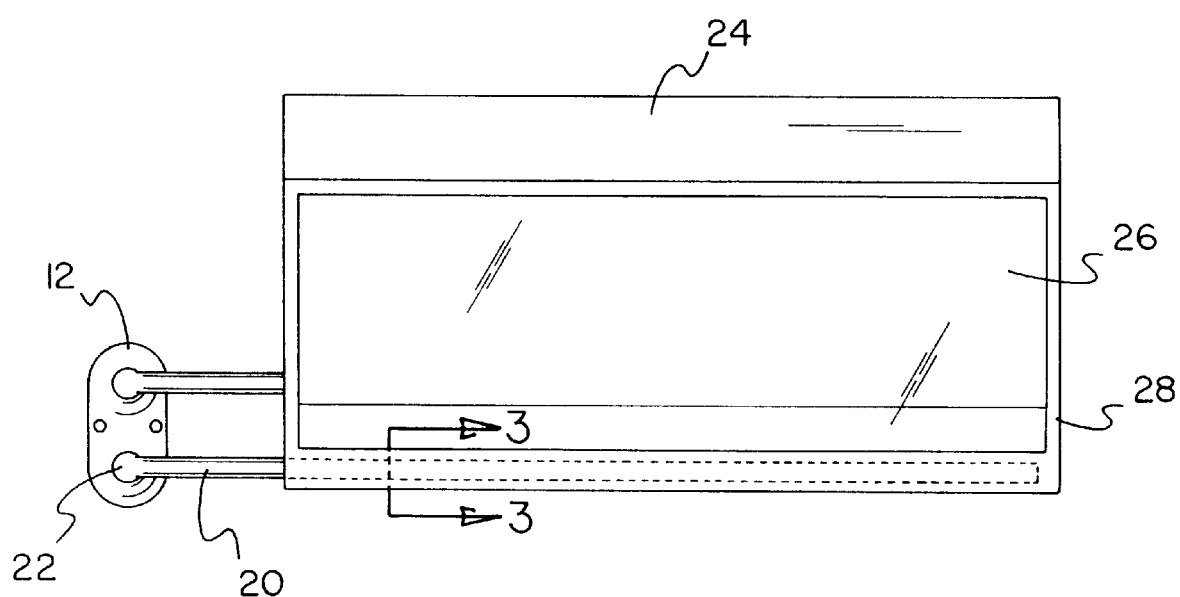
FIG. 2 is a front view of the present invention illustrated with both panels in a raised orientation.
Figure 3:
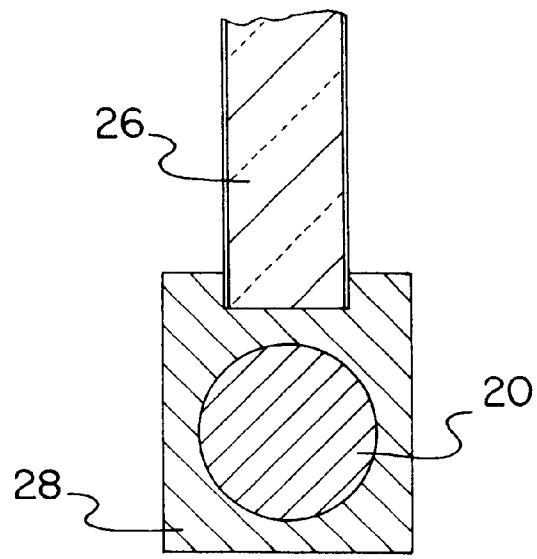
FIG. 3 is a cross-sectional view of the present invention as taken along line 3—3 of FIG. 2.
Figure 4:
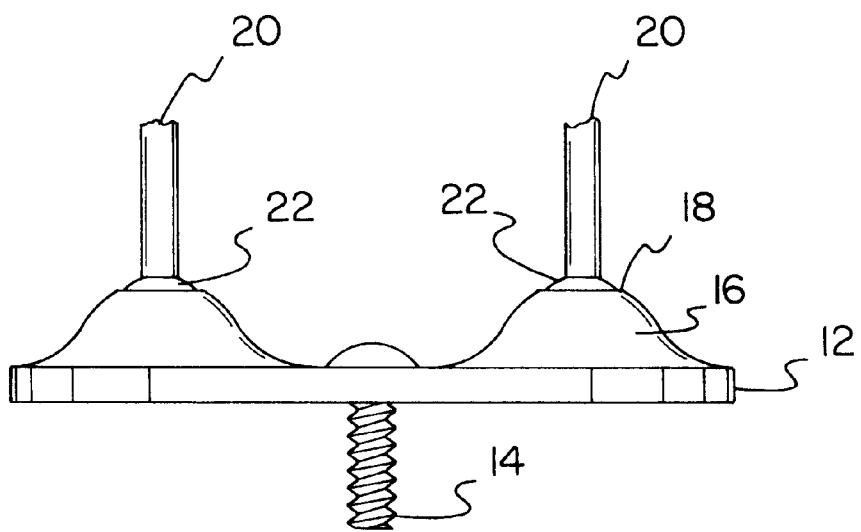
FIG. 4 is a side view of the mounting bracket of the present invention.

With reference now to the drawings, and in particular to FIGS. 1 through 4 thereof, a new sun visor for automobiles embodying the principles and concepts of the present invention and generally designated by the reference numeral 10 will be described.

As best illustrated in FIGS. 1 through 4, the sun visor for automobiles 10 comprises a mounting bracket 12 secured to an upper interior surface of a motor vehicle. The mounting bracket 12 has a threaded screw 14 extending through a central portion thereof for securement to the motor vehicle. An outer surface of the mounting bracket 12 is defined by a pair of raised sockets 16. Each of the sockets 16 have an aperture 18 formed therewithin.

A pair of swivel arms 20 are coupled with the mounting bracket 12. Each of the swivel arms 20 have a ball 22 disposed on an inner end thereof for being received within the apertures 18 of the raised sockets 16 of the mounting bracket 12 to create a pivotal connection whereby the swivel arms 20 can be freely maneuvered.

An opaque visor 24 is secured to an outer section of a first of the pair of swivel arms 20.

A tinted, transparent visor 26 is secured to an outer section of a second of the pair of swivel arms 20. The tinted, transparent visor 26 has a peripheral frame 28 extending therearound.

In use, the tinted, transparent visor 26 would help reduce glare for the driver for improved visibility in bright sunlight conditions. When the tinted, transparent visor 26 is lowered in front of the driver, it would block out bright sunlight glare and UV rays while still maintaining a view to the roadway for the driver. The opaque visor 22 would be used in other conditions desired by the driver. When not in use, both visors 22,26 could be pivoted out of the way for later use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sun visor for automobiles for providing multiple panels for use in different weather conditions comprising, in combination:

a mounting bracket secured to an upper interior surface of a motor vehicle, the mounting bracket having a threaded screw extending through a central portion thereof for securement to the motor vehicle, an outer surface of the mounting bracket being defined by a pair of raised sockets, each of the sockets having an aperture formed therein;

a pair of swivel arms coupled with the mounting bracket, each of the swivel arms having a ball disposed on an inner end thereof for being received within the apertures of the raised sockets of the mounting bracket, a pivotal connection whereby the swivel arms can be freely maneuvered, the aperture having a diameter less than a diameter of the ball and greater than three-fourths the diameter of the ball such that the ball is retained in the raised socket;

an opaque visor secured to an outer section of a first of the pair of swivel arms;

a tinted, transparent visor secured to an outer section of a second of the pair of swivel arms, the tinted, transparent visor having a peripheral frame extending therearound; and wherein the pair of raised sockets protruding orthogonally outward from the surface of the mounting bracket for providing a greater arc of swivel positionability of the swivel arms with respect to the mounting bracket.

2. A sun visor for automobiles for providing multiple panels for use in different weather conditions comprising, in combination:

a mounting bracket secured to an upper interior surface of a motor vehicle, an outer surface of the mounting bracket being defined by a pair of raised sockets;

a pair of swivel arms coupled with the mounting bracket, each of the swivel arms having a ball disposed on an inner end thereof for being received within the aperture of the raised sockets of the mounting bracket, a pivotal connection whereby the swivel arms can be freely maneuvered, the aperture having a diameter less than a diameter of the ball and greater than three-fourths the diameter of the ball such that the ball is retained in the raised socket;

an opaque visor secured to an outer section of a first of the pair of swivel arms;

a tinted, transparent visor secured to an outer section of a second of the pair of swivel arms; and wherein the pair of raised sockets protruding orthogonally outward from the surface of the mounting bracket for providing a greater arc of swivel positionability of the swivel arms with respect to the mounting bracket.

3. The sun visor for automobiles as set forth in claim 2 wherein the mounting bracket having a threaded screw extending through a central portion thereof for securement to the motor vehicle.

4. The sun visor for automobiles as set forth in claim 2 wherein the tinted, transparent visor has a peripheral frame extending therearound.

* * * * *